(12) United States Patent
McCaughtry

(10) Patent No.: US 6,827,109 B2
(45) Date of Patent: Dec. 7, 2004

(54) FLEXIBLE HOSE AND METHOD OF MANUFACTURE

(75) Inventor: Donald C. McCaughtry, Columbiana, OH (US)

(73) Assignee: Salem-Republic Rubber Company, Sebring, OH (US)

(*) Notice: Subject to any disclaimer, the term of this patent is extended or adjusted under 35 U.S.C. 154(b) by 0 days.

(21) Appl. No.: 10/391,697

(22) Filed: Mar. 19, 2003

(65) Prior Publication Data

US 2003/0178083 A1 Sep. 25, 2003

Related U.S. Application Data

(60) Provisional application No. 60/367,307, filed on Mar. 25, 2002.

(51) Int. Cl.[7] .................................... F16L 11/08
(52) U.S. Cl. ................... 138/134; 138/129; 138/122; 138/133; 138/150; 138/154; 138/174; 138/127
(58) Field of Search .................. 138/130, 129, 138/121, 122, 126, 133, 134, 127, 150, 154, 174

(56) References Cited

U.S. PATENT DOCUMENTS

| | | | | |
|---|---|---|---|---|
| 2,508,774 A | * | 5/1950 | Roberts | 138/111 |
| 2,674,297 A | * | 4/1954 | Greenwald | 156/143 |
| 2,713,381 A | * | 7/1955 | Seck | 29/453 |
| 3,112,771 A | | 12/1963 | Bringolf | 138/129 X |
| 3,248,272 A | | 4/1966 | Sawada | 138/122 X |
| 4,098,298 A | * | 7/1978 | Vohrer | 138/122 |
| 4,196,755 A | * | 4/1980 | Kutnyak et al. | 138/150 |
| 4,304,266 A | * | 12/1981 | Kutnyak et al. | 138/129 |
| 4,490,575 A | * | 12/1984 | Kutnyak | 174/47 |
| 4,628,966 A | * | 12/1986 | Kanao | 138/122 |
| 4,982,765 A | * | 1/1991 | Usui | 138/122 |
| 5,454,061 A | | 9/1995 | Carlson | 392/478 |
| 5,637,168 A | | 6/1997 | Carlson | 156/143 |
| 5,702,132 A | * | 12/1997 | Friederich et al. | 285/235 |
| 5,899,237 A | * | 5/1999 | Akedo et al. | 138/129 |
| 5,975,144 A | * | 11/1999 | Akedo et al. | 138/129 |
| 6,305,428 B1 | * | 10/2001 | Nakamura et al. | 138/126 |
| 6,308,741 B1 | | 10/2001 | Payne | 138/110 |

* cited by examiner

*Primary Examiner*—Patrick Brinson
(74) *Attorney, Agent, or Firm*—Buckingham, Doolittle & Burroughs, LLP; David P. Dureska

(57) ABSTRACT

A flexible hose and a method for manufacturing the same includes a hose tube having a smooth exterior surface. The hose tube exterior surface has a fabric and cover laminated or wrapped thereon. The lead end of a single wire is helically wound about the hose tube on top of the cover. The wire in turn is at least partially encased by a rubber ridge preferably having a height greater than the thickness of the hose tube wall. The rubber ridge tapers in the direction of valleys formed between the ridges, and the resulting hose structure has improved flexibility by enabling the hose to flex at every valley, yet sufficient strength for heavy duty applications.

8 Claims, 2 Drawing Sheets

FLEXIBLE HOSE AND METHOD OF MANUFACTURE

This application claims benefit of Ser. No. 60/376,307 filed Mar. 25, 2002.

BACKGROUND OF THE INVENTION

1. Field of the Invention

The invention relates to hoses and a method for manufacturing the same, and in particular to a hose suitable for heavy-duty applications yet having improved flexibility. More particularly, the present invention is directed to a hose having a corrugated exterior surface containing a single wire lead at least partially surrounded by a tapered rubber profile that facilitates flexibility and easy handling of the hose but is capable of withstanding the wear and tear encountered during the intended uses of the hose.

2. Background Art

Typically, the purpose of a hose is to provide a flexible connector or conduit between two points. In the past, there have been many attempts to manufacture a hose that is both flexible and that possesses the necessary strength to meet the specifications of a given application. However, these two requirements of flexibility and strength often conflict. More particularly, making the hose strong enough using conventional manufacturing technology conflicts with the desire to make the hose as flexible as possible. Flexibility is desirable for workers to make their handling and use of the hose easier, less fatiguing, less time-consuming in its application, and more convenient. In most applications where such flexibility is required, some part of the hose strength must be compromised. Where this sacrifice cannot be accommodated, the hose must be stiffer with the previously mentioned problems posed by the non-flexibility that comes with such stiffness.

Heretofore, hoses designed to be flexible conventionally have been made with a double wire lead. More specifically, two wires are wound around the exterior surface of the hose in a spaced-apart, parallel and helical fashion. Alternating spaces between the wires then are filled with a section of rubber, and over-wrapped with a layer of rubber that becomes the hose cover. Prior to the hose being cured, it is wrapped with a helically wound overlapping strip of cure tape, usually made of nylon, so that it will shrink during the cure to consolidate the hose layers. Following this overwrap of the cure tape, but prior to the hose being cured, a rope, which normally also will shrink during the cure, is wound around the hose between the wires in the spaces that have not been filled with the previously mentioned filling rubber.

This method of manufacture will produce the desired alternating ridges and valleys or corrugation seen in hoses made to be more flexible than hoses made with smooth exterior surfaces. Typically, the difference in height between the top of each raised rubber ridge to the bottom of each valley where the rope is placed is normally less than the overall thickness of the hose wall as measured from the bottom of the valley where the rope is placed to the interior surface of the hose. Therefore, when the hose is bent, the flexing takes place between the alternating wires and the rope valleys. However, because only every other valley can compress, the flexibility of the hose is reduced.

The present invention solves a long-felt need in the art by providing a novel flexible hose construction and process of manufacture that will provide the required strength to meet the needs of a given application while also being extremely flexible for ease of handling. This unexpected result is achieved through a hose structure manufactured with a single helically-wound wire covered with a tapered rubber profile, and wherein the height of the tapered rubber profile is greater than the thickness of the hose tube wall.

SUMMARY OF INVENTION

Objectives of the present invention include providing and manufacturing a relatively flexible hose that is easy to handle, but which is capable of withstanding the wear and tear encountered during heavy-duty use of the hose.

Another objective of the present invention is to provide such a flexible hose that generally is free of kinking or collapse when it is bent.

A further objective of the present invention is to provide such a flexible hose which is relatively inexpensive and lightweight, yet durable.

These objectives and advantages are obtained by the flexible hose and method of manufacture of the present invention, the general nature of which may be stated as including a flexible hose comprising a hose tube having an exterior surface, a single wire helically wrapped about the hose tube, an elastomeric ridge at least partially encasing the wire, the elastomeric ridge forming alternating ridges and valleys on the hose tube exterior surface.

BRIEF DESCRIPTION OF THE DRAWINGS

The preferred embodiment of the present invention, illustrative of the best mode in which applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
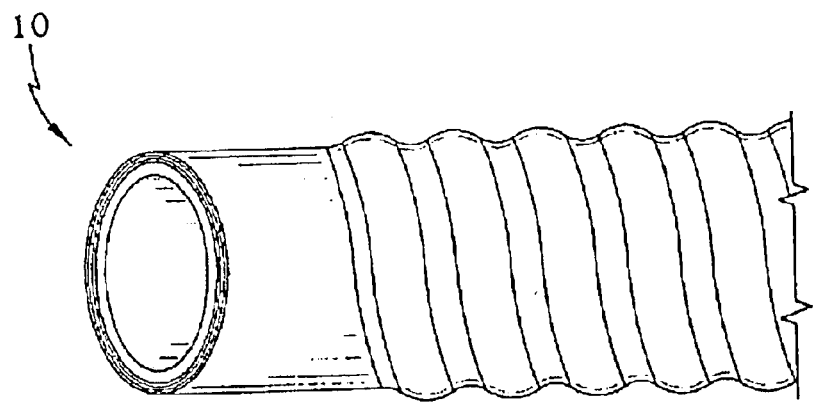
FIG. 1 is a fragmentary perspective view of a prior art hose, having a generally smooth interior surface, a corrugated outer surface, and a hose cover.
Figure 2:
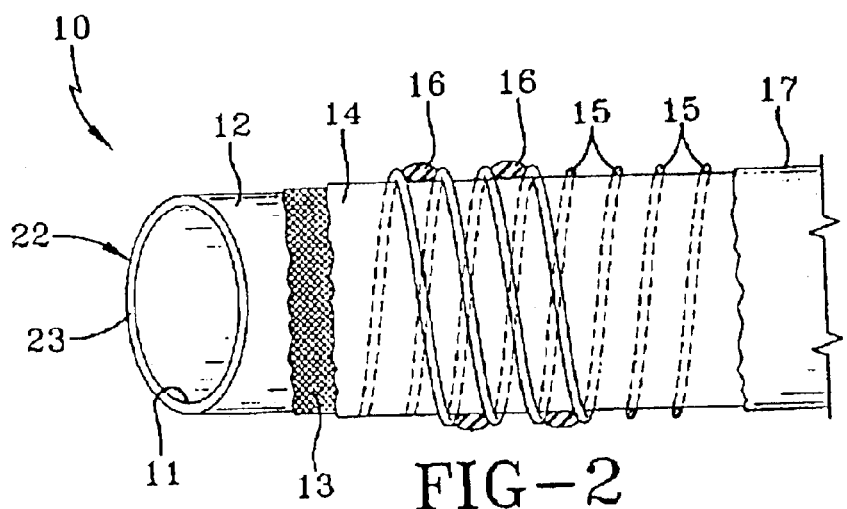
FIG. 2 is a view similar to FIG. 1, but with portions broken away, in section, and represented by phantom lines to show the fabric, the cover, and the two spaced parallel wires wrapped around the hose exterior surface in a helical fashion, and a section of rubber occupying the space between the wires.

A prior art flexible hose of a type well-known in the art and used in heavy industrial applications for the conveyance of fluids such as gasoline or powders such as flour, is indicated generally at 10, and is shown in FIG. 1. Corrugated prior art hose 10 includes a hose tube 22 having a wall 23 defined by an interior surface 11 and a smooth exterior surface 12. A fabric 13 is disposed on exterior surface 12, and a cover 14 in turn is disposed on fabric 13. Two ends of wire 15 then are wrapped around exterior surface 12 and on top of cover 14 in a spaced-apart, parallel helical fashion to create a space between the two wires. A section or ridge of rubber 16 is disposed in every other space between wires 15, and a hose cover 17, preferably formed of rubber, in turn is disposed on exterior surface 12, encasing wires 15 and rubber ridges 16, as best illustrated in FIG. 2.

Figure 3:
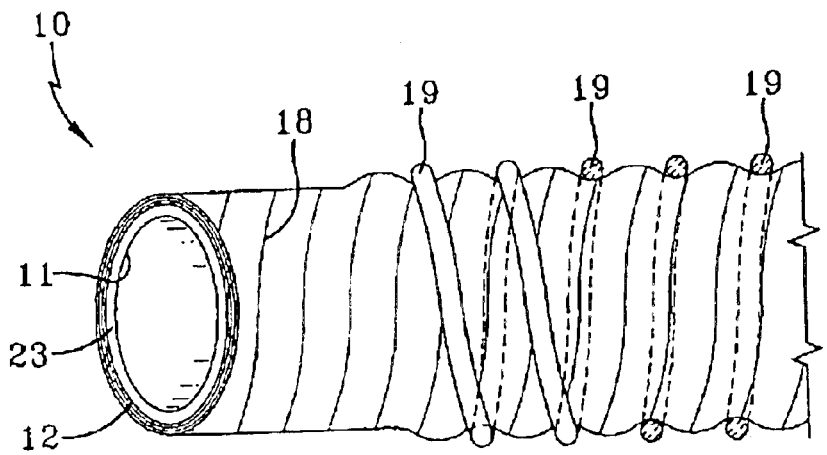
FIG. 3 is a view similar to FIG. 1, but showing the prior art hose wrapped in cure tape and a rope.
Figure 4:
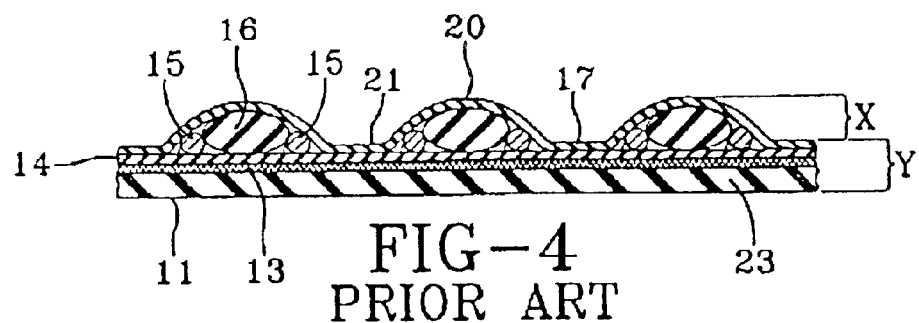
FIG. 4 is a fragmentary flattened cross-sectional view of the prior art hose depicted in FIG. 2, and showing the relationship between the heights of the rubber ridges and the hose tube wall.

Before prior art hose 10 is cured, it typically is wrapped with a helically wound overlapping strip of cure tape 18, usually made of nylon, so that the cure tape will shrink during the cure to consolidate the hose layers (FIG. 3). Following this overwrap of cure tape 18, but prior to the cure, a rope 19 which normally also will shrink during the cure, is wound around hose exterior surface 12 on top of cure tape 18 and between wires 15 in the spaces that have not been filled with the previously mentioned section of rubber 16, as also illustrated in FIG. 3. This method of manufacture produces similar alternating ridges 20 and valleys 21 (FIG. 4) as seen in prior art hoses made to be more flexible than hoses made with smooth exterior surfaces. Moreover, the difference in height X between the top of each ridge 20 and the bottom of each valley 21 normally is less than the overall thickness Y of hose tube wall 23 as measured from the bottom of the valley to hose tube interior surface 11, as illustrated in FIG. 4. Therefore, when prior art hose 10 is bent, the flexing takes place between alternating wires 15 and valleys 21. However, because only every other valley 21 can compress, the flexibility of prior art hose 10 is not optimal.

The present invention contemplates a novel flexible hose 30 comprising a hose tube 22 having a wall 23 defined by an interior surface 11 and a smooth exterior surface 12. The manner of forming hose tube 22 is well known in the art and hose forming industry, and typically consists of laminating or wrapping a section or strip of rubber or other hose material around a length of pole by any method commonly known in the prior art. Prior to wrapping the pole, which is typically made of a metal such as steel or aluminum, the pole preferably is lubricated to facilitate easy removal of the hose from the pole after hose tube 22 is formed.

Figure 5:
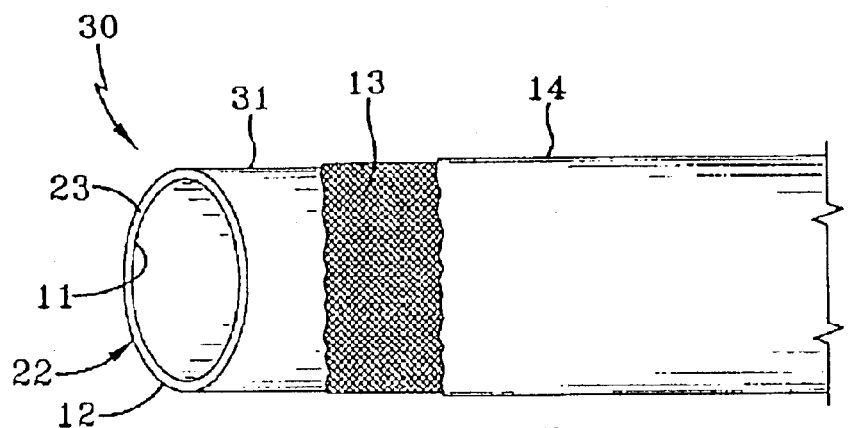
FIG. 5 is a fragmentary perspective view of the hose tube portion of the hose of the present invention, having smooth interior and exterior surfaces, shown wrapped in a fabric and a cover.

Following formation of hose tube 22, fabric 13 is laminated or wrapped around exterior surface 12 of the hose tube. Cover 14 then is laminated or wrapped around hose tube exterior surface 12 on top of fabric 13, as illustrated in FIG. 5. Fabric 13 and cover 14 are typically made of the same material as used in the prior art, that being nylon and neoprene, respectively, and can be wrapped around the hose tube by any means commonly known in the prior art.

A main feature of the structure of hose 30 of the present invention is a single wire 32, wherein the lead or end of the wire is wound around hose tube exterior surface 12 in a helical fashion on top of cover 14. Wire 32 adds strength and integrity to flexible hose construction 30 and generally prevents kinking or collapse of the hose when it is bent. Wire 32 preferably is formed of a high tensile steel material, but it is contemplated that other materials such as polypropylene could also be used to form the wire, as is well known to the art and in the literature. The pitch of wire 32 around the exterior surface of hose tube 22 preferably is from about 1.00 to about 2.00 inches, and most preferably is about 1.50 inches. However, it is contemplated that a pitch of greater than 2.00 inches could be used, without affecting the overall concept of the present invention.

Figure 6:
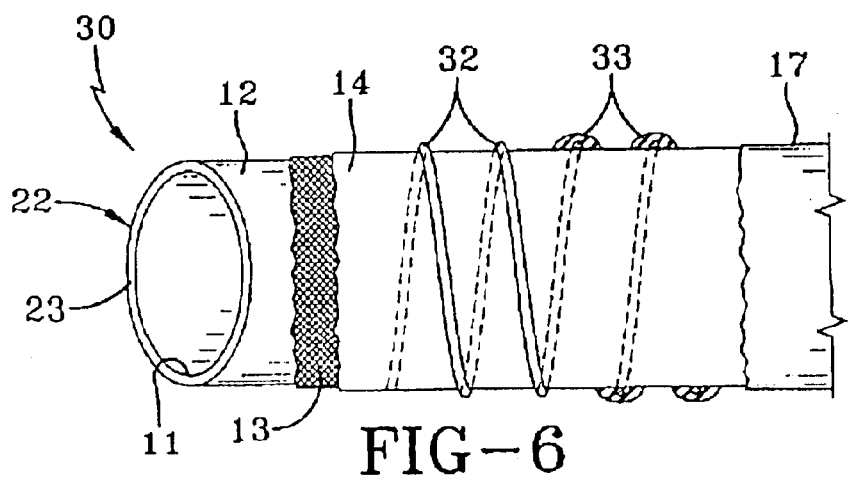
FIG. 6 is a fragmentary perspective view of the flexible hose of the present invention, with portions broken away, in section, and represented by phantom lines, shown including a single wire helically wrapped around the hose exterior surface and encased in a tapered rubber ridge.

In accordance with another key feature of the present invention, on top of and generally centered upon wire 32 is an elastomeric or rubber section or ridge 33, as best illustrated in FIG. 6. Although other geometric shapes are contemplated, the profile of rubber section 33 preferably is in the shape of a semi-ellipse with the bottom or flat side of the rubber section having a notch along about its longitudinal center line for receipt of wire 32. The elastomer used to form ridge 33 preferably has a durometer of from about 50 to about 80 Shore A, and more preferably from about 50 to about 70 Shore A. However, other levels of hardness also are contemplated without affecting the overall concept of the present invention.

Figure 7:
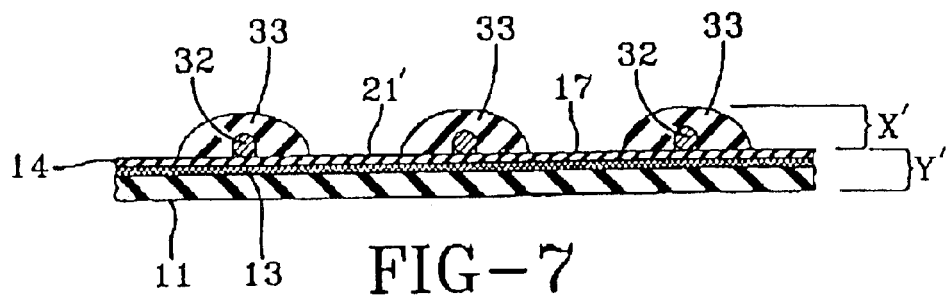
FIG. 7 is a fragmentary flattened cross-sectional view of the flexible hose of the present invention depicted in FIG. 6, and showing the relationship between the heights of the rubber ridges and the hose tube wall.

Wire 32 and rubber ridge 33 produce the desired similar alternating ridges 20' and valleys 21' that exist in prior art hose 10. However, in comparison and contrast, in the present invention the height X' of rubber section 33 preferably is greater than the height or thickness Y' of hose tube wall 23, as measured from the bottom of valley 21' to interior surface 11 of the hose tube, as illustrated in FIG. 7. Notwithstanding the forgoing, it is understood that the height or thickness Y' of hose tube wall 23, as measured from the bottom of valley 21' to interior surface 11 of the hose tube, could be greater than the height X' of rubber section 33 without effecting the present invention.

This relationship between the height X' of rubber ridge 33 and the thickness Y' of hose tube 22 serves to transfer and spread out the high modulus of wire 32. By way of an example, and without limiting the scope of the present invention, the typical dimensions of a finished flexible hose construction 30 having a four-inch inside diameter would be a height X' of rubber ridge 33 of about 0.37 inches, and a thickness Y' of hose tube 22 of about 0.26 inches.

This use of rubber ridge 33 over wire 32 in combination with the height X' of the rubber ridge being greater than the thickness Y' of hose tube 22, provides exceptional flexibility to hose 30. This structural combination enables hose 30 to flex between every helix of wire 32 or in every valley 21', and not just at every other one as in prior art hoses such as hose 10 described hereinabove.

In addition, rubber ridge 33 has a novel profile in that its edges are tapered in the direction of valleys 21', which increases hose flexibility as well. In prior art hose constructions such as hose 10, the rubber profile lacked such a taper, as best shown in FIG. 4 at numeral 20, which further restricted flexing. The taper or profile of rubber ridge 33 in the present invention construction acts like a leaf spring with a gradual increase in stiffness in moving toward the top of the ridge, and facilitates a smooth transition of the stresses, produced as a result of resistance to hose bending and collapse, from hose tube 22 to wire 32. More particularly, wire 32 includes a periphery with an upper portion and a pair of side portions, and the thickness of the elastomer in ridge 33 on the upper portion of the wire is less than the thickness of the elastomer on each one of the side portions. This taper also enables the bending transition of flexible hose 30 to be a continuous rather than step function. Typically, the elastomeric materials utilized in flexible hose construction 30 are thermoset rubbers, but other types of elastomers also are contemplated without affecting the general concept of the invention.

Prior to curing, flexible hose 30 is wrapped with a helically wound overlapping strip of cure tape 18 (FIG. 3). Cure tape 18 typically is wound in a direction opposite to that of the lead end of wire 32, and in a manner so that each successive revolution of cure tape 18 overlaps the previous revolution by preferably from about 25 to about 75%, and more preferably about 50%, thereby creating a helical lap joint. Cure tape 18 is of a type commonly known in the prior art, and typically is made of a nylon fabric, although other types of tape and other methods for wrapping the cure tape also are contemplated.

Following the wrapping of cure tape 18, but prior to curing, a rope 19 is helically wound around flexible hose construction 30 on top of cure tape 18 (FIG. 3). Rope 19 is of a type commonly known in the prior art and typically is nylon or polyester, and is wound in the valleys 21 in the same direction as the lead end of wire 32.

Flexible hose 30 then is cured by any means typically known in the prior art including, but not limited to, a steam autoclave or a hot air oven for a sufficient period of time to allow the flexible hose to cure. The cure time will vary according to many factors including, but not limited to, the type of material used in hose tube 22, the overall size of the construction of flexible hose 30 and the temperature of the curing device.

After flexible hose 30 has been cured, cure tape 18 and rope 19 can be removed from the hose by any means known in the prior art, and the hose then can be removed from the pole and is ready for use. These many plies of materials and reinforcements present in the structure of hose 30 also adds to hose strength.

While it is understood that the present invention is particularly useful for flexible hoses used in heavy industrial applications such as conveyance of fluids such as gasoline or powders such as flour, it is contemplated that the concepts of the present invention could be used in other applications as well.

Accordingly, the flexible hose construction and method of manufacture therefore of the present invention is simplified, provides an effective, safe, inexpensive and reliable structure and process which achieve all of the enumerated objectives, provide for eliminating difficulties encountered with prior hoses and manufacturing methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the flexible hose construction is used and manufactured, the characteristics of the construction, arrangement and method steps, and the advantageous, new and useful results obtained; the new and useful structures, devices, elements, arrangements, process, parts and combinations are set forth in the appended claims.

What is claimed is:

1. A flexible hose comprising a hose tube having an exterior surface, a single wire helically wrapped about said hose tube, said wire having a periphery, said periphery including at least an upper portion and a pair of side portions, an elastomeric ridge at least partially encasing said wire, said elastomeric ridge forming alternating ridges and valleys on said hose tube exterior surface, wherein in said ridges the thickness of said elastomer on said upper portion of said wire is less than the thickness of said elastomer on each one of said side portions of said wire, whereby said ridges distribute bending stresses of said hose in a substantially continuous manner.

2. The flexible hose construction of claim 1, in which said hose tube includes an interior surface and said exterior surface is smooth; and in which the height of said elastomeric ridge as measured from the hose tube exterior surface to the top of said ridge, is greater than the thickness of said hose tube as measured from said hose tube exterior surface to said hose tube interior surface.

3. The flexible hose construction of claim 1, in which a fabric is disposed directly on said hose tube exterior surface; and in which a cover is disposed on said fabric; and in which the fabric and the cover are located beneath said wire.

4. The flexible hose construction of claim 1, in which said hose tube is formed of a thermoset rubber.

5. The flexible hose construction of claim 1, in which said ridge is formed of an elastomer having a durometer of from about 50 to about 80 Shore A.

6. The flexible hose construction of claim 1, in which said wire has a pitch of from about 1.25 to about 1.75 inches.

7. The flexible hose construction of claim 1, in which said elastomeric ridge has a semi-elliptical profile with a flat bottom, said bottom being formed with a notch for receipt of said wire.

8. The flexible hose construction of claim 1, in which said wire is formed of a high tensile steel material.

\* \* \* \* \*